(12) United States Patent
Zhao

(10) Patent No.: US 12,056,391 B2
(45) Date of Patent: Aug. 6, 2024

(54) SSD-BASED LOG DATA STORAGE METHOD AND APPARATUS, DEVICE AND MEDIUM

(71) Applicant: INSPUR SUZHOU INTELLIGENT TECHNOLOGY CO., LTD., Jiangsu (CN)

(72) Inventor: Baolin Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 72 days.

(21) Appl. No.: 17/923,190

(22) PCT Filed: Jan. 25, 2021

(86) PCT No.: PCT/CN2021/073497
§ 371 (c)(1),
(2) Date: Nov. 3, 2022

(87) PCT Pub. No.: WO2021/223468
PCT Pub. Date: Nov. 11, 2021

(65) Prior Publication Data
US 2023/0185480 A1 Jun. 15, 2023

(30) Foreign Application Priority Data

May 8, 2020 (CN) .......................... 202010380420.2

(51) Int. Cl.
*G06F 3/06* (2006.01)
(52) U.S. Cl.
CPC .......... *G06F 3/0656* (2013.01); *G06F 3/0619* (2013.01); *G06F 3/0679* (2013.01)
(58) Field of Classification Search
CPC .... G06F 3/0656; G06F 3/0619; G06F 3/0679; G06F 3/0649; G06F 3/0659; G06F 3/061; G06F 12/10; G06F 12/0893; Y02D 10/00
See application file for complete search history.

(56) References Cited

U.S. PATENT DOCUMENTS

| | | | |
|---|---|---|---|
| 11,520,510 B1* | 12/2022 | Thangaraj | G06F 3/0631 |
| 2011/0191522 A1* | 8/2011 | Condict | G06F 12/123 |
| | | | 711/E12.001 |

(Continued)

FOREIGN PATENT DOCUMENTS

| | | |
|---|---|---|
| CN | 106873908 A | 6/2017 |
| CN | 107402724 A | 11/2017 |

(Continued)

OTHER PUBLICATIONS

CN202010380420.2 first office action.
PCT/CN2021/073497 international search report.

*Primary Examiner* — Hiep T Nguyen
(74) *Attorney, Agent, or Firm* — IPro, PLLC

(57) ABSTRACT

An SSD-based log data storage method includes: configuring metadata in a running state in log data to be continuously stored in a memory physical address of an SSD; dividing a preset number of buffers for an area where the metadata is continuously stored in the memory physical address; storing update data of the metadata generated during a reading-writing process according to the preset cyclic sequence; defining a mapping table of a memory logical address and a physical address of the log data; in response to the full storage of one buffer, executing an NAND writing operation on data in the buffer region, executing a preset length of NAND writing operation on metadata not written into a NAND in the SSD; in response to the completion of the NAND writing operation, ranking the corresponding buffer last in the preset cyclic sequence and waiting to store the update data of the metadata.

16 Claims, 4 Drawing Sheets

(56) References Cited

U.S. PATENT DOCUMENTS

| | | | |
|---|---|---|---|
| 2014/0297918 A1* | 10/2014 | Lee | G06F 12/0804 |
| | | | 711/102 |
| 2015/0199138 A1 | 7/2015 | Ramachandran et al. | |
| 2017/0262194 A1* | 9/2017 | Kodama | G06F 11/1068 |
| 2018/0024737 A1* | 1/2018 | Dubeyko | G06F 3/064 |
| | | | 711/102 |
| 2021/0124649 A1* | 4/2021 | Sasson | G06F 12/0253 |
| 2021/0133117 A1* | 5/2021 | Shabi | G06F 12/1009 |

FOREIGN PATENT DOCUMENTS

| | | |
|---|---|---|
| CN | 107422992 A | 12/2017 |
| CN | 109918234 A | 6/2019 |
| CN | 111581126 A | 8/2020 |

\* cited by examiner

| Meta A | Other1 | Meta B | Meta C | Other2 | Meta D | Other3 | Meta E |

FIG. 2

| Meta A | Meta B | Meta C | Meta D | Meta E | Other1 | Other2 | Other3 |

FIG. 3

| Meta | Other |

FIG. 4

| Meta | Delta1 | Delta2 | Delta3 | Delta4 | Other |

FIG. 5

| Meta | Buf1 | Buf2 | Buf3 | Buf4 | Other |

FIG. 6

| Buf1 | Meta1 | Buf2 | Meta2 | Buf3 | Meta3 | Buf4 | Meta4 | ...... | Other |

FIG. 7

| Meta1 | Meta2 | Meta3 | Meta4 | Buf1 | Meta5 | Buf2 | Meta6 | ...... | Other |

SSD-BASED LOG DATA STORAGE METHOD AND APPARATUS, DEVICE AND MEDIUM

The present application claims the priority of the Chinese patent application filed on May 8, 2020 before the Chinese Patent Office with the application number of 202010380420.2 and the title of "SSD-BASED LOG DATA STORAGE METHOD AND APPARATUS, DEVICE AND MEDIUM", which is incorporated herein in its entirety by reference.

FIELD

The present disclosure relates to the technical field of computer storage, and particularly relates to a journal data based on solid state drive saving method and apparatus, a device and a medium.

BACKGROUND

With the development and the extensive application of techniques such as Internet, cloud computing, Internet of Things and big data, in human life, mass data are generated all the time. Those mass data require processing and storage, and the high-speed development of the information technology has made higher requirements on the performance of storage systems. Solid state disks, because of their high read-write speed and low energy consumption, are being extensively applied.

Currently, solid state disks are being used increasingly more extensively, and higher requirements on the performance and the capacity of solid state disks are raised. With the development of the technique of flash memory and the improvement of the performance of the main controlling chips, the techniques relevant to solid state disks are continuously updating, whereby they may satisfy the demands of applications to the largest extent.

Currently, the usage scenes of solid state disks have become increasingly more complicated, and are making increasingly higher requirements on solid state disks. Both of the performance and the stability have strict standards, and the most important is the uniformity of performance. In other words, during the usage of a solid state disk, sudden change of the read-write performance is not allowed, which causes that the application cannot predict the state of the solid state disk, to bring unnecessary troubles to the operation of the application. How to ensure the uniformity of the performance of solid state disks has become one of the important issues in the study of the firmware of solid state disks.

In the design of current solid state disks, because of the inherent characteristics of the Flash Translation Layer (FTL), the increasing of the physical capacity is accompanied by the increasing of the demands on the other hardware units. In the firmware design of solid state drives, how many metadata exist, and how to manage those metadata to ensure the normal operation of the Solid State Drive(SSD), have become key issues in solid state drive firmware design.

In conventional solid state drive firmware implementations, the Journal data are stored substantially based on the updated quantity plus the original quantity, and are stored by means of multiple backups, to individually save the different types of metadata, which might have a good safety. However, regarding the characteristics of NANDs, the stability of Single Level Cell (SLC) blocks is far higher than that of Trinary Level Cell (TLC) blocks, which has ensured the data correctness very well in this term. Therefore, the mode of multiple backups and type distinguishing does not only result in resource wasting, but also increases the complexity of the firmware designing.

SUMMARY

In view of the above, an object of the embodiments of the present disclosure is to provide a journal data based on solid state drive saving method and apparatus, a device and a medium.

In order to achieve the above object, an aspect of the present disclosure provides a journal data based on solid state drive saving method, wherein the method includes:

configuring metadata in an operating state in journal data to be continuously saved in internal-storage physical addresses of a solid state drive;

dividing a region in the internal-storage physical addresses where the metadata are continuously saved into buffer regions of a preset quantity, so that the buffer regions have a preset circulating sequence;

according to the preset circulating sequence, saving updated data of the metadata generated in a reading-writing process;

defining a mapping table between internal-storage logical addresses of the journal data and the physical addresses;

in response to one of the buffer regions being full, performing a NAND writing operation to data in the buffer region, and performing the NAND writing operation of a preset length to the metadata in the solid state drive that are not written into the NAND; and in response to the NAND writing operation being completed, arranging the corresponding buffer region at the end of the preset circulating sequence to wait for saving the updated data of the metadata.

In some embodiments of the journal data based on solid state drive saving method according to the present disclosure, the method further includes:

in response to an internal-storage accessing request being received, determining whether the internal-storage accessing request is a journal accessing request; and in response to determination that the internal-storage accessing request is the journal accessing request, accessing the mapping table, converting an address of the accessing request into the physical address, and returning data accessed according to the physical address obtained after the conversion to an accessor.

In some embodiments of the journal data based on solid state drive saving method according to the present disclosure, the method further includes:

in response to an address-mapping modifying request being received, checking whether a conflict exists; and in response to a conflict existing, searching for a conflicting mapping item and bringing back the conflicting mapping item to the solid state drive.

In some embodiments of the journal data based on solid state drive saving method according to the present disclosure, the method further includes:

in a power-on process, performing, by the solid state drive, a bad-block scanning operation to the NAND; and according to the bad-block scanning operation, selecting a plurality of undamaged blocks in the NAND to be used as standby replacing blocks when a RAID group has a bad block.

In some embodiments of the journal data based on solid state drive saving method according to the present disclosure, the operations of, in response to one of the buffer regions being full, performing the NAND writing operation to the data in the buffer region, and performing the NAND writing operation of the preset length to the metadata in the solid state drive that are not written into the NAND further includes:

configuring the buffer region and the preset length to be positive integer times of a smallest writing unit of the NAND.

Another aspect of the embodiments of the present disclosure further provides a journal data based on solid state drive saving apparatus, wherein the apparatus includes:

a continuously saving module, wherein the continuously saving module is configured for, configuring metadata in an operating state in journal data to be continuously saved in internal-storage physical addresses of a solid state drive;

a buffer-region configuring module, wherein the buffer-region configuring module is configured for, dividing a region in the internal-storage physical addresses where the metadata are continuously saved into buffer regions of a preset quantity, so that the buffer regions have a preset circulating sequence;

an updated-data saving module, wherein the updated-data saving module is configured for, according to the preset circulating sequence, saving updated data of the metadata generated in a reading-writing process;

a mapping module, wherein the mapping module is configured for, defining a mapping table between internal-storage logical addresses of the journal data and the physical addresses;

a NAND-writing-operation module, wherein the NAND-writing-operation module is configured for, in response to one of the buffer regions being full, performing a NAND writing operation to data in the buffer region, and performing the NAND writing operation of a preset length to the metadata in the solid state drive that are not written into the NAND; and a sorting module, wherein the sorting module is configured for, in response to the NAND writing operation being completed, arranging the corresponding buffer region at the end of the preset circulating sequence to wait for saving the updated data of the metadata.

In some embodiments of the journal data based on solid state drive saving apparatus according to the present disclosure, the apparatus further includes a request determining module, and the request determining module is configured for:

in response to an internal-storage accessing request being received, determining whether the internal-storage accessing request is a journal accessing request; and in response to determination that the internal-storage accessing request is the journal accessing request, accessing the mapping table, converting an address of the accessing request into the physical address, and returning data accessed according to the physical address obtained after the conversion to an accessor.

In some embodiments of the journal data based on solid state drive saving apparatus according to the present disclosure, the apparatus further includes a conflict checking module, and the conflict checking module is configured for:

in response to an address-mapping modifying request being received, checking whether a conflict exists; and in response to a conflict existing, searching for a conflicting mapping item and bringing back the conflicting mapping item to the solid state drive.

Another aspect of the embodiments of the present disclosure further provides a computer device, wherein the computer device includes:

at least one processor; and a memory, wherein the memory stores a computer program that is executable in the at least one processor, and the processor, when executing the program, implements the journal data based on solid state drive saving method stated above.

Yet another aspect of the embodiments of the present disclosure further provides a computer-readable storage medium, the computer-readable storage medium storing a computer program, wherein the computer program, when executed by at least one processor, implements the journal data based on solid state drive saving method stated above.

The present disclosure has at least the following advantageous technical effects: the present disclosure employs a unified metadata storage mode, which reduces the complexity of the storage of the metadata and the complexity of the recovery of the metadata, greatly reduces the difficulty in solid state drive firmware design, improves the high-tech versatility and maintainability of the modules, reduces the consumption on the NAND resource, and reduces the cost.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are merely embodiments of the present disclosure, and those having ordinary skill in the art may obtain other embodiments according to these figures without paying creative work.

FIG. 2 shows a schematic diagram of a data saving mode in a DDR in the prior art;

FIG. 3 shows a schematic diagram of the mode of the continuous saving of the metadata in a DDR according to the embodiments of the journal data based on solid state drive saving method according to the present disclosure;

FIG. 4 shows a schematic diagram of the mode of the continuous saving of the metadata in a DDR according to the embodiments of the journal data based on solid state drive saving method according to the present disclosure, wherein the types of the metadata are not distinguished;

FIG. 5 shows a schematic diagram of a saving mode of updated data in a DDR in the prior art;

FIG. 6 shows a schematic diagram of the mode of the division of the buffer regions according to the embodiments of the journal data based on solid state drive saving method according to the present disclosure;

FIG. 7 shows a schematic diagram of the mode of the NAND writing according to the embodiments of the journal data based on solid state drive saving method according to the present disclosure;

FIG. 8 shows a schematic diagram of the state of the address mapping according to the embodiments of the journal data based on solid state drive saving method according to the present disclosure;

DETAILED DESCRIPTION

In order to make the objects, the technical solutions and the advantages of the present disclosure clearer, the embodiments of the present disclosure will be further described in detail with reference to the particular embodiments and the drawings.

It should be noted that all of the expressions using "first" and "second" in the embodiments of the present disclosure are intended to distinguish two different entities or different parameters that have the same names. It can be seen that "first" and "second" are merely for the convenience of the expression, and should not be construed as a limitation on the embodiments of the present disclosure, which will not be explained in detail in the subsequent embodiments.

In order to achieve the above object, a first aspect of the embodiments of the present disclosure provides the embodiments of a journal data based on solid state drive saving method.

Figure 1:
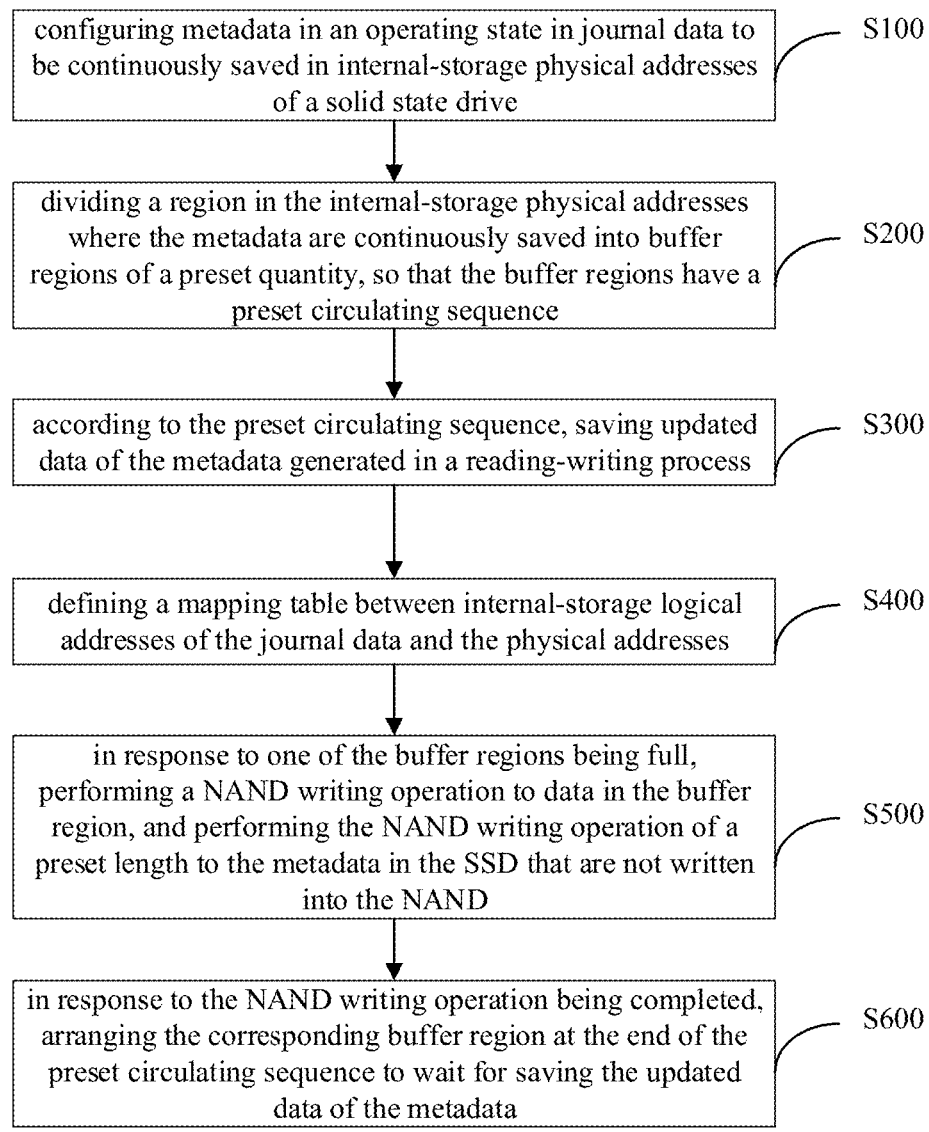
FIG. 1 shows a schematic block diagram of the embodiments of the journal data based on solid state drive saving method according to the present disclosure.

FIG. 1 shows a schematic diagram of the embodiments of the journal data based on solid state drive saving method according to the present disclosure. In the embodiment shown in FIG. 1, the method includes at least the following operations:

S100: configuring metadata in an operating state in journal data to be continuously saved in internal-storage physical addresses of a solid state drive;

S200: dividing a region in the internal-storage physical addresses where the metadata are continuously saved into buffer regions of a preset quantity, so that the buffer regions have a preset circulating sequence;

S300: according to the preset circulating sequence, saving updated data of the metadata generated in a reading-writing process;

S400: defining a mapping table between internal-storage logical addresses of the journal data and the physical addresses;

S500: in response to one of the buffer regions being full, performing a NAND writing operation to data in the buffer region, and performing the NAND writing operation of a preset length to the metadata in the solid state drive that are not written into the NAND; and S600: in response to the NAND writing operation being completed, arranging the corresponding buffer region at the end of the preset circulating sequence to wait for saving the updated data of the metadata.

In the designing of Solid State Drive (SSD) in the prior art, all of the metadata in the operating state are stored in a Double Data Rate (DDR) internal storage. In some embodiments of the present disclosure, it is required to continuously save all of the metadata into the DDR, to improve the continuity and the simplicity of the storage of the metadata. There are the following difficulties in realizing the continuity of the storage of the metadata. When the user is using the solid state drive disk, the accessing is random, and the resultant updating of the metadata is also random. The data saving mode in the DDR is shown in FIG. 2, wherein Meta represents the metadata used in the operating state, Meta A, Meta B, Meta C, Meta D and Meta E represent different types of the metadata, and Other represents the other data than the metadata of Journal. Firstly, in some embodiments of the present disclosure, it is required to place all of the Meta together in the physical internal storage, as shown in FIG. 3. Accordingly, it is not required to distinguish the types of the Meta, as shown in FIG. 4. In order to convert several discontinuous physical addresses into continuous physical addresses, a hardware solution or a software solution may be employed, wherein the hardware solution may realize access acceleration, and the software solution may realize self-controllability. Because all of the blocks are continuous (in some embodiments, it must be ensured that pages are used beginning from 0 in a strictly continuous and progressively increasing manner), it is merely required to save the initial address, which reduces the size of the Journal-data mapping table. However, in the saving of the Journal module, the above-described Meta is merely part of the data, but the data updating of the metadata generated in the reading-writing process is random. Assuming that merely the Meta region is saved, they cannot be saved all at once, because the data volume is excessively huge, which causes that the supercapacitor of an enterprise-class solid state drive has an insufficient electric quantity, which results in an excessively long power-off duration and a disk abnormality. Currently, in some prior-art solutions, the data updating generated in the random reading-writing process is referred to as Delta, and its saving mode in the DDR is shown in FIG. 5. In the general prior art, the solid state drive is divided into a plurality of Delta regions for each type of the metadata, for example, the Delta1, Delta2, Delta3 and Delta4 in FIG. 5. When one of the Delta regions is full, it is written into the NAND together with part of the Meta region corresponding thereto (in order to be recovered in the power-on process). Accordingly, the difference in the speeds of the updating and changing of each type of the metadata results in the difference in the speeds of the generation of the Deltas. In order to further realize the sequential storage and be adapted for the above-described operations, the types of the Meta data are normalized into one type, and the data types of all of the Deltas are required to be defined into one type. The region in the solid state drive internal-storage physical address where the metadata are continuously saved are divided into buffer regions of a preset quantity, as shown in FIG. 6, wherein the buffer regions are abbreviated as Buf, and the different buffer regions are classified by using serial numbers. All of the above addresses are physical addresses, and subsequently a mapping table of the DDR logical addresses and the physical addresses is defined. Sequence design is performed to the buffer regions to ensure that they are used in the predetermined sequence. In some embodiments of the present disclosure, the buffer regions are defined to be 4 buffer regions, and they are prescribed to be circularly used in the sequence of 1→2→3→4→1. In another embodiment, the quantity of the buffer regions may be configured according to practical applications. When the Buf1 is full, the NAND writing of the Meta data with the length of L beginning from Buf1 is initiated, as shown in FIG. 7, wherein all of the Meta1, Meta2, Meta3, Meta4 and so on are metadata obtained by sequentially dividing the Meta shown in FIG. 6 with the length of L. As shown in FIG. 7, in some prior-art solutions, all of embedded systems have a simple function of address mapping, but once the mapping items being configured, they are not allowed to be modified. In some embodiments of the present disclosure, it is required to continuously map the Buffer addresses into new positions, and in the continuous saving, the address mapping might have a state shown in FIG. 8. In other words, when the Buf1 is full, and has been written into the NAND together with Meta1, the Buf1 is mapped to a new address, and, as shown in FIG. 8, mapped in front of Meta5. Accordingly, after all of the Buf2-4 being written into the NAND, the Buf1 is used again, and is subsequently written into the NAND together with the Meta5, which is repeated. In the next time of power-on, the information of the initial address is read, and subsequently the data in the NAND are sequentially read to the corresponding positions of the DDR. Because the distribution of the metadata is not allowed to change before and after power-on and power-off, the storage addresses of the NAND and the positions of the DDR correspond one to one, whereby it is not required to maintain the mapping table of the NAND addresses and the DDR addresses.

According to some embodiments of the journal data based on solid state drive saving method according to the present disclosure, the method further includes:

in response to an internal-storage accessing request being received, determining whether the internal-storage accessing request is a journal accessing request; and in response to determination that the internal-storage accessing request is the journal accessing request, accessing the mapping table, converting an address of the accessing request into the physical address, and returning data accessed according to the physical address obtained after the conversion to an accessor.

Figure 9:
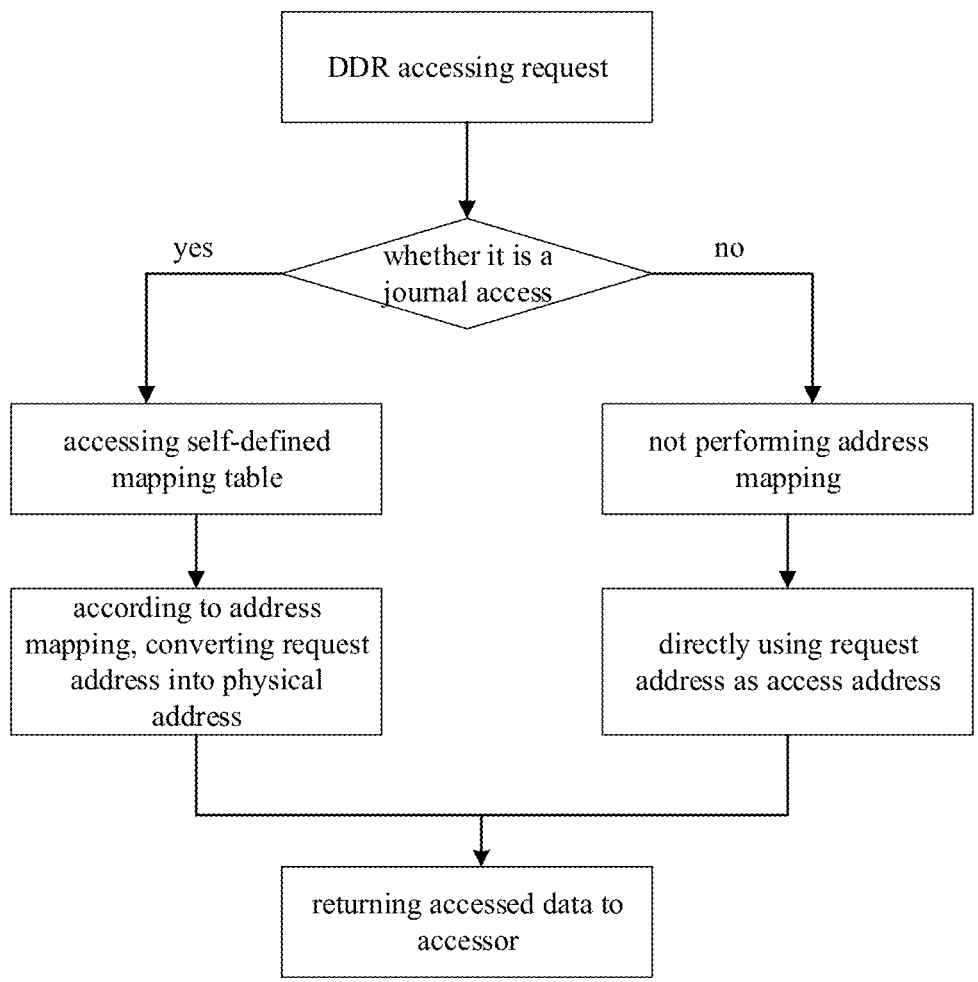
FIG. 9 shows a flow chart of the determination on the accessing request according to an embodiment of the journal data based on solid state drive saving method according to the present disclosure.

In some embodiments of the present disclosure, as shown in FIG. 9, when a DDR accessing request is received, it is determined whether the accessing request is a Journal access. If it is a Journal access, then the self-defined mapping table is accessed. According to the address mapping, the request address is converted into a physical address, and the data accessed according to the address obtained after the conversion are returned to the accessor. If it is determined that the accessing request is not a Journal access, then no address mapping is performed, the request address is directly used as the access address, and subsequently the data accessed according to the access address are returned to the accessor.

According to some embodiments of the journal data based on solid state drive saving method according to the present disclosure, the method further includes:

in response to an address-mapping modifying request being received, checking whether a conflict exists; and in response to a conflict existing, searching for a conflicting mapping item and bringing back the conflicting mapping item to the solid state drive.

Figure 10:
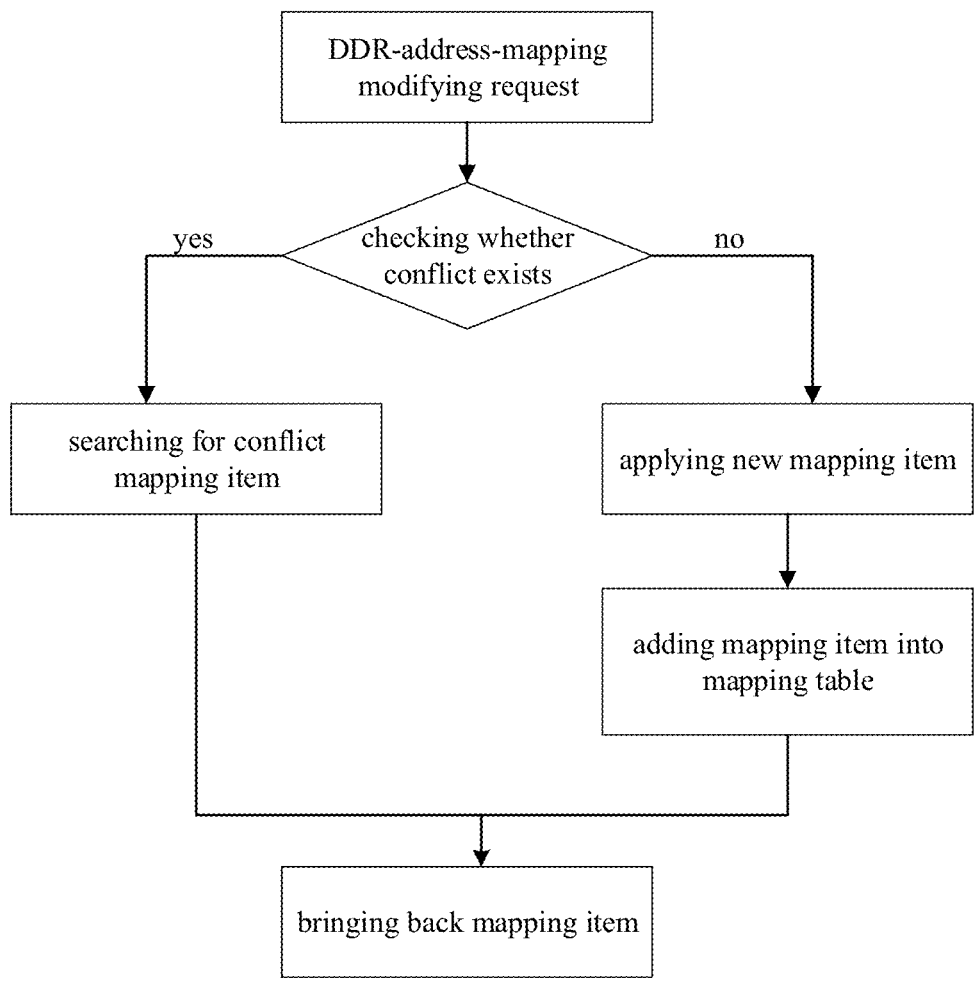
FIG. 10 shows a flow chart of the modification on the DDR address mapping according to the embodiments of the journal data based on solid state drive saving method according to the present disclosure.

In some embodiments of the present disclosure, as shown in FIG. 10, when a request of modifying the DDR address mapping is received, it is checked whether a conflict exists. If a conflict exists, a conflict mapping item is searched for, an address-mapping modifying state is returned, and the mapping item is brought back. If no conflict exists, then a new mapping item is applied, the mapping item is added into the mapping table, an address-mapping modifying state is returned, and the mapping item is brought back.

According to some embodiments of the journal data based on solid state drive saving method according to the present disclosure, the method further includes:

in a power-on process, performing, by the solid state drive, a bad-block scanning operation to the NAND; and according to the bad-block scanning operation, selecting a plurality of undamaged blocks in the NAND to be used as standby replacing blocks when a RAID group has a bad block.

In some embodiments of the present disclosure, the saving of the metadata does not employ the mode of multiple backups, but employs the mode of RAID5. Generally, in the case of multiple backups, at least the mode of 1+1 is employed; in other words, one part of the metadata occupies two blocks. However, by means of RAID5, the mode of N+1 may be employed, and accordingly N parts of the metadata occupy merely N+1 blocks. Therefore, the consumption of the blocks is reduced to (N+1)/N*2 of the original consumption, wherein usually N is 15, and accordingly the block consumption becomes 53.3%. However, in solid state drive systems, the state of the NAND is unpredictable, and it is possible that 16 blocks are selected to form one RAID group, but they include one or more bad blocks, which cannot store data. Further, because the data are placed by means of continuous saving, those bad blocks cause that some data cannot be correctly saved. RAID, in some prior-art solutions, skips bad blocks to ensure that data are not saved into the bad blocks to prevent data losing. However, in some embodiments of the present disclosure, in order to solve the problem, it is required to introduce bad-block replacing blocks, to solve the problem based on software. In the power-on process, the solid state drive performs bad-block scanning, and subsequently the Journal module, according to the result of the scanning, identifies the bad blocks and the undamaged blocks among the 16 blocks, and uses some of the undamaged blocks as standby. In some embodiments, 4 undamaged blocks are selected as standby blocks in a standby group, and when the RAID group has a bad block, some of the blocks are selected from the standby group for replacement, to realize a dynamic replaceable rule, and ensure the normal use of the RAID.

According to some embodiments of the journal data based on solid state drive saving method according to the present disclosure, the operations of, in response to one of the buffer regions being full, performing the NAND writing operation to the data in the buffer region, and performing the NAND writing operation of the preset length to the metadata in the solid state drive that are not written into the NAND further includes:

configuring the buffer region and the preset length to be positive integer times of a smallest writing unit of the NAND.

In some embodiments of the present disclosure, when the Buf1 is full, the NAND writing with the length of L beginning from Buf1 is initiated, wherein L is restricted by the operation units of the NAND. In some embodiments, the mode of RAID5 is employed, whereby the length of L may be expanded to the size of multiple 16k (16k is the smallest writing unit of the NAND). In this case, it is required to fix the size of the buffer regions and the size of the Metas obtained after the division, wherein the sizes may be determined according to the size L of the writing unit of the NAND.

Because the saving of the metadata in the operating state is continuous, the Journal module is merely required to acquire the initial address and the ending address of the metadata region, and subsequently save the region as a whole. In this case, the size of the page of one SLC block is 16k (i.e., the standard of all of the NAND manufacturers currently), and therefore the saving might involve the usage of multiple SLC pages. When RAID5 is used, one RAID row may save the size of N*16k.

In the saving of the Journal, firstly the first metadata address of the size of N*16k is sent to a NAND-writing module to complete the NAND saving of the data (to facilitate the recovery in the next time of power-on), the first saved address is saved, and subsequently the next metadata of the size of N*16k are sent to the NAND write module. The writing process is sequentially repeated, till the entire metadata region has been saved into the NAND.

Another aspect of the embodiments of the present disclosure provides the embodiments of a journal data based on solid state drive saving apparatus. the apparatus includes:

a continuously saving module, wherein the continuously saving module is configured for, configuring metadata in an operating state in journal data to be continuously saved in internal-storage physical addresses of a solid state drive;

a buffer-region configuring module, wherein the buffer-region configuring module is configured for, dividing a region in the internal-storage physical addresses where the metadata are continuously saved into buffer regions of a preset quantity, so that the buffer regions have a preset circulating sequence;

an updated-data saving module, wherein the updated-data saving module is configured for, according to the preset circulating sequence, saving updated data of the metadata generated in a reading-writing process;

a mapping module, wherein the mapping module is configured for, defining a mapping table between internal-storage logical addresses of the journal data and the physical addresses;

a NAND-writing-operation module, wherein the NAND-writing-operation module is configured for, in response to one of the buffer regions being full, performing a NAND writing operation to data in the buffer region, and performing the NAND writing operation of a preset length to the metadata in the solid state drive that are not written into the NAND; and a sorting module, wherein the sorting module is configured for, in response to the NAND writing operation being completed, arranging the corresponding buffer region at the end of the preset circulating sequence to wait for saving the updated data of the metadata.

According to some embodiments of the journal data based on solid state drive saving apparatus according to the present disclosure, the apparatus further includes a request determining module, and the request determining module is configured for:

in response to an internal-storage accessing request being received, determining whether the internal-storage accessing request is a journal accessing request; and in response to determination that the internal-storage accessing request is the journal accessing request, accessing the mapping table, converting an address of the accessing request into the physical address, and returning data accessed according to the physical address obtained after the conversion to an accessor.

According to some embodiments of the journal data based on solid state drive saving apparatus according to the present disclosure, the apparatus further includes a conflict checking module, and the conflict checking module is configured for:

in response to an address-mapping modifying request being received, checking whether a conflict exists; and in response to a conflict existing, searching for a conflicting mapping item and bringing back the conflicting mapping item to the solid state drive.

In order to achieve the above object, another aspect of the embodiments of the present disclosure further provides a computer device, wherein the computer device includes: at least one processor; and a memory, wherein the memory stores a computer program that is executable in the at least one processor, and the at least one processor, when executing the program, implements the journal data based on solid state drive saving method stated above.

Yet another aspect of the embodiments of the present disclosure further provides a computer-readable storage medium, the computer-readable storage medium storing a computer program, wherein the computer program, when executed by at least one processor, implements the journal data based on solid state drive saving method stated above.

Similarly, those having ordinary skill in the art should understand that all of the embodiments, the features and the advantages that are described above with respect to the journal data based on solid state drive saving method according to the present disclosure also apply to the apparatus, the computer device and the medium according to the present disclosure. In order for the brevity of the present disclosure, they are not described repeatedly herein.

It should be particularly noted that the operations according to the embodiments of the journal data based on solid state drive saving method and apparatus, the device and the medium stated above may be mutually mixed, replaced, added and removed. Therefore, those reasonable arrangements, combinations and variations of the journal data based on solid state drive saving method and apparatus, the device and the medium should also fall within the protection scope of the present disclosure, and the protection scope of the present disclosure should not be limited to the embodiments.

Finally, it should be noted that those having ordinary skill in the art may understand that all or some of the processes of the methods according to the above embodiments may be implemented by relative hardware according to an computer instruction from a computer program, the program of the journal data based on solid state drive saving method may be stored in a computer-readable storage medium, and the program, when executed, may contain the processes of the embodiments of the method stated above. The storage medium of the program may be a diskette, an optical disk, a Read-Only Memory (ROM), a Random Access Memory (RAM) and so on. The embodiments of the computer program may reach an effect the same as or similar to those of any of the above-described process embodiments corresponding thereto.

Furthermore, the method according to the embodiments of the present disclosure may also be implemented as a computer program executed by at least one processor, wherein the computer program may be stored in a computer-readable storage medium. The computer program, when executed by the at least one processor, executes the above-described functions defined in the method according to the embodiments of the present disclosure. Furthermore, the above-described method operations and system units may also be implemented by using a controller and a computer-readable storage medium that is used to store a computer program enabling the controller to execute the functions of the steps or units.

Furthermore, it should be noted that the computer-readable storage medium (for example, a memory) as used herein may be a volatile memory or a non-volatile memory, or may include both of a volatile memory and a non-volatile memory. As an example rather than limitative, the non-volatile memory may include a read-only memory (ROM), a programmable ROM (PROM), an electrically programmable ROM (EPROM), an electrically erasable programmable ROM (EEPROM) or a flash memory. The volatile memory may include a Random Access Memory (RAM), wherein the RAM may serve as an external cache memory. As an example rather than limitative, the RAM may be embodied in various forms, such as a synchronous RAM (DRAM), a dynamic RAM (SRAM), a synchronous DRAM (SDRAM), a double-data-rate SDRAM (DDRSDRAM), an enhanced SDRAM (ESDRAM), a Synch link DRAM (SLDRAM) and a direct Rambus RAM, (DRRAM). The storage devices according to the disclosed aspects are intend to include but be not limited to memories of those and other suitable types.

Those of ordinary skill in the art should also understand that various illustrative logical blocks, modules, electric circuits and algorithm operations described with reference to the disclosure herein may be embodied as electronic hardware, computer software or a combination thereof. In order to clearly explain the interchangeability between the hardware and the software, it has been described generally with reference to the functions of various illustrative components, blocks, modules, electric circuits and operations. Whether those functions are embodied as software or hardware depends on the particular applications and the design constraints exerted on the entire system. Those of ordinary skill in the art may employ different modes to implement the functions with respect to each of the particular applications, but those implementation decisions should not be considered as leading to departing from the scope disclosed by the embodiments of the present disclosure.

The various illustrative logical blocks, modules and electric circuits described with reference to the disclosure herein may be implemented or executed by using the following components configured to implement those functions: a generic at least one processor, a Digital Signal Processor (DSP), an Application Specific Integrated Circuits (ASIC), a Field-Programmable Gate Array (FPGA) or another programmable logic device, a discrete gate or transistor logic device, a discrete hardware component, or any combination of those components. The generic at least one processor may be a microprocessor, but, alternatively, the at least one processor may be any traditional at least one processor, controller, microcontroller or state machine. The at least one processor may also be embodied as a combination of computing devices, for example, the combination of a DSP and a microprocessor, a plurality of microprocessors, the combination of one or more microprocessors and a DSP, and/or any other type of such a configuration.

The operations of the methods or algorithms described with reference to the disclosure herein may be directly contained in hardware, in a software module executed by at least one processor, or in a combination thereof. The software module may reside in an RAM memory, a flash memory, an ROM memory, an EPROM memory, an EEPROM memory, a register, a hard disk, a removable disk, a CD-ROM, or any other type of storage media known in the art. An exemplary storage medium is coupled to at least one processor, whereby the at least one processor may read data from the storage medium or write data into the storage medium. In an alternative solution, the storage medium may be integrated with the at least one processor. The at least one processor and the storage medium may reside in an ASIC. The ASIC may reside in a user terminal. In an alternative solution, the at least one processor and the storage medium may reside in a user terminal as discrete components.

In one or more exemplary configurations, the functions may be implemented in hardware, software, firmware or any combination thereof. If implemented in software, the functions may be stored in a computer-readable storage medium as one or more computer instructions or codes or transmitted via a computer-readable storage medium. The computer-readable medium includes a computer storage medium and a communication medium, wherein the communication medium includes any medium that facilitates to transmit the computer program from one location to another location. The storage medium may be any available medium that may be accessed by a generic or dedicated computer. As an example rather than limitative, the computer-readable storage medium may include an RAM, an ROM, an EEPROM, a CD-ROM or another optical-disk storage device, and a magnetic-disk storage device or another magnetic storage device, or is any other medium that may be used to carry or store a program code in the form of a computer instruction or required by the data structure and may be accessed by a generic or dedicated computer or a generic or dedicated at least one processor. Furthermore, any connection may be suitably referred to as a computer-readable storage medium. For example, if a coaxial cable, an optical-fiber cable, a twisted pair, a digital subscriber line (DSL) or a wireless technique such as infrared, radio and microwave is used to send software from a website, a server or another remote source, then all of the coaxial cable, the optical-fiber cable, the twisted pair, the DSL or the wireless technique such as infrared, radio and microwave are encompassed within the definition of the medium. As used herein, the magnetic disk and the optical disk include a compact disk (CD), a laser disk, an optical disk, a Digital Video Disk (DVD), a floppy disk and a blue-ray disk, wherein the magnetic disk usually magnetically reproduces data, and the optical disk optically reproduces data by using laser. The combination of the above contents should also be encompassed within the scope of the computer-readable storage medium.

The illustrative embodiments disclosed by the present disclosure are described above, but it should be noted that many variations and modifications may be made without departing from the scope of the embodiments of the present disclosure defined by the claims. The functions, operations and/or acts of the process claims according to the disclosed embodiments described herein are not required to be implemented in any specific sequence. Furthermore, although the elements of the embodiments of the present disclosure may be described or claimed in a singular form, unless explicitly limited as singular, they may also be comprehended as plural.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

The serial numbers of the embodiments of the present disclosure are merely for the purpose of description, and do not indicate the relative preferences of the embodiments.

Those of ordinary skill in the art may understand that all or some of the operations for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

Those having ordinary skill in the art should understand that the discussion on any of the above embodiments is merely illustrative, and are not intended to imply that the scope (including the claims) of the embodiments of the present disclosure is limited to those examples. With the concept of the embodiments of the present disclosure, the embodiments or the technical features of different embodiments may be combined, and many other variations of different aspects of the embodiments of the present disclosure as stated above may exist, which are not provided in detail for brevity. Therefore, any omissions, modifications, equivalent substitutions and improvements that are made within the spirit and the principle of the embodiments of the present disclosure should fall within the protection scope of the embodiments of the present disclosure.

The invention claimed is:

1. A journal data based on solid state drive saving method, wherein the method comprises:
configuring metadata in an operating state in journal data to be continuously saved in internal-storage physical addresses of a solid state drive;
dividing a region in the internal-storage physical addresses where the metadata are continuously saved into buffer regions of a preset quantity, so that the buffer regions have a preset circulating sequence;
according to the preset circulating sequence, saving updated data of the metadata generated in a reading-writing process;
defining a mapping table between internal-storage logical addresses of the journal data and physical addresses;
in response to one of the buffer regions being full, performing a NAND writing operation to data in the buffer region, and performing the NAND writing operation of a preset length to the metadata in the solid state drive that are not written into the NAND; and
in response to the NAND writing operation being completed, arranging the corresponding buffer region at the end of the preset circulating sequence to wait for saving the updated data of the metadata;
in response to an internal-storage accessing request being received, determining whether the internal-storage accessing request is a journal accessing request; and
in response to determination that the internal-storage accessing request is the journal accessing request, accessing the mapping table, converting an address of the internal-storage accessing request into the physical address, and returning data accessed according to the physical address obtained after the conversion to an accessor.

2. The journal data based on solid state drive saving method according to claim 1, wherein the method further comprises:
in response to an address-mapping modifying request being received, checking whether a conflict exists; and
in response to a conflict existing, searching for a conflicting mapping item and bringing back the conflicting mapping item to the solid state drive.

3. The journal data based on solid state drive saving method according to claim 2, wherein the method further comprises:
in response to no conflict existing, applying a new mapping item, adding the new mapping item into the mapping table, and returning an address-mapping modifying state and bringing back the new mapping item.

4. The journal data based on solid state drive saving method according to claim 1, wherein the method further comprises:
in a power-on process, performing, by the solid state drive, a bad-block scanning operation to the NAND; and
according to the bad-block scanning operation, selecting a plurality of undamaged blocks in the NAND to be used as standby replacing blocks when a RAID group has a bad block.

5. The journal data based on solid state drive saving method according to claim 1, wherein the operation of, in response to one of the buffer regions being full, performing the NAND writing operation to the data in the buffer region, and performing the NAND writing operation of the preset length to the metadata in the solid state drive that are not written into the NAND further comprises:
configuring the buffer region and the preset length to be positive integer times of a smallest writing unit of the NAND.

6. The journal data based on solid state drive saving method according to claim 1, wherein the method further comprises:
in response to determination that the accessing request is not the journal accessing request, directly using the request address as the access address, and returning the data accessed according to the access address to the accessor.

7. A computer device, wherein the computer device comprises:
at least one processor; and
a memory, wherein the memory stores a computer program that is executable in the processor, and the processor, when executing the program, implements the operations comprising:
configuring metadata in an operating state in journal data to be continuously saved in internal-storage physical addresses of a solid state drive;
dividing a region in the internal-storage physical addresses where the metadata are continuously saved into buffer regions of a preset quantity, so that the buffer regions have a preset circulating sequence;
according to the preset circulating sequence, saving updated data of the metadata generated in a reading-writing process;
defining a mapping table between internal-storage logical addresses of the journal data and physical addresses;
in response to one of the buffer regions being full, performing a NAND writing operation to data in the buffer region, and performing the NAND writing operation of a preset length to the metadata in the solid state drive that are not written into the NAND; and
in response to the NAND writing operation being completed, arranging the corresponding buffer region at the end of the preset circulating sequence to wait for saving the updated data of the metadata;
in response to an internal-storage accessing request being received, determining whether the internal-storage accessing request is a journal accessing request; and
in response to determination that the internal-storage accessing request is the journal accessing request, accessing the mapping table, converting an address of the internal-storage accessing request into the physical address, and returning data accessed according to the physical address obtained after the conversion to an accessor.

8. The computer device according to claim 7, wherein the operations further comprises:
in response to an address-mapping modifying request being received, checking whether a conflict exists; and
in response to a conflict existing, searching for a conflicting mapping item and bringing back the conflicting mapping item to the solid state drive.

9. The computer device according to claim 7, wherein the operations further comprises:
in a power-on process, performing, by the solid state drive, a bad-block scanning operation to the NAND; and
according to the bad-block scanning operation, selecting a plurality of undamaged blocks in the NAND to be used as standby replacing blocks when a RAID group has a bad block.

10. The computer device according to claim 7, wherein the operation of, in response to one of the buffer regions being full, performing the NAND writing operation to the data in the buffer region, and performing the NAND writing operation of the preset length to the metadata in the solid state drive that are not written into the NAND further comprises:

configuring the buffer region and the preset length to be positive integer times of a smallest writing unit of the NAND.

11. A non-transitory computer-readable storage medium, the computer-readable storage medium storing a computer program, wherein the computer program, when executed by at least one processor, implements the operations comprising:

configuring metadata in an operating state in journal data to be continuously saved in internal-storage physical addresses of a solid state drive;

dividing a region in the internal-storage physical addresses where the metadata are continuously saved into buffer regions of a preset quantity, so that the buffer regions have a preset circulating sequence;

according to the preset circulating sequence, saving updated data of the metadata generated in a reading-writing process;

defining a mapping table between internal-storage logical addresses of the journal data and physical addresses;

in response to one of the buffer regions being full, performing a NAND writing operation to data in the buffer region, and performing the NAND writing operation of a preset length to the metadata in the solid state drive that are not written into the NAND; and in response to the NAND writing operation being completed, arranging the corresponding buffer region at the end of the preset circulating sequence to wait for saving the updated data of the metadata;

in response to an internal-storage accessing request being received, determining whether the internal-storage accessing request is a journal accessing request; and in response to determination that the internal-storage accessing request is the journal accessing request, accessing the mapping table, converting an address of the internal-storage accessing request into the physical address, and returning data accessed according to the physical address obtained after the conversion to an accessor.

12. The non-transitory computer-readable storage medium according to claim 11, wherein the operations further comprises:

in response to an address-mapping modifying request being received, checking whether a conflict exists.

13. The non-transitory computer-readable storage medium according to claim 12, wherein the operations further comprises:

in response to a conflict existing, searching for a conflicting mapping item and bringing back the conflicting mapping item to the solid state drive.

14. The non-transitory computer-readable storage medium according to claim 11, wherein the operations further comprises:

in a power-on process, performing, by the solid state drive, a bad-block scanning operation to the NAND.

15. The non-transitory computer-readable storage medium according to claim 14, wherein the operations further comprises:

according to the bad-block scanning operation, selecting a plurality of undamaged blocks in the NAND to be used as standby replacing blocks when a RAID group has a bad block.

16. The non-transitory computer-readable storage medium according to claim 11, wherein the operation of, in response to one of the buffer regions being full, performing the NAND writing operation to the data in the buffer region, and performing the NAND writing operation of the preset length to the metadata in the SSD that are not written into the NAND further comprises:

configuring the buffer region and the preset length to be positive integer times of a smallest writing unit of the NAND.

* * * * *